United States Patent Office 3,639,342
Patented Feb. 1, 1972

3,639,342
METHOD FOR PREPARING HETEROCYCLIC POLYMER FROM DIAMINO-DIAMIDO COMPOUNDS AND POLYCARBOXYLIC ACID DERIVATIVES
Yasuo Miyadera, Tatuo Masuko, Tadashi Muroi, Shinichi Okada, and Hiroshi Noguchi, Hitachi-shi, Japan, assignors to Hitachi, Ltd., Hitachi Chemical Company, Ltd., and Hitachi Cable, Ltd., Tokyo, Japan
No Drawing. Filed Aug. 2, 1968, Ser. No. 749,581
Int. Cl. C08g 33/02
U.S. Cl. 260—47 CP          22 Claims

ABSTRACT OF THE DISCLOSURE

A solid heterocyclic polymer capable of forming cast film and fiber, especially useful for heat-stable insulating wire, having a novel aromatic nucleus-fused bis(4-thia-1,3-diazine oxide), bis(1,3-diazine oxide) ring or combination thereof in its repeated unit. The polymer is produced by reacting aromatic O-diamino-diamido compounds with aromatic or aliphatic polybasic acid anhydrides or halides to form a new polyamide, and cyclizing under dehydration the polyamide.

The present invention relates to a thermostable film-forming heterocyclic polymer and the process for the production thereof.

Broadly speaking, the present invention relates to a film-forming polymer having a novel repeated unit of aromatic nucleus-fused bis(4-thia-1,3-diazine oxide) ring, benzobis-(1,3-diazine oxide) ring or in combination thereof.

A novel heterocyclic polymer of the present invention is represented by the formula

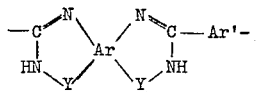

(I)

wherein Ar is a tetravalent aromatic residue in which each pair of N and Y is attached to the adjacent positions thereof, Y is $SO_2$ or CO, and Ar' represents two or more valent aromatic or aliphatic residue, and when Ar' is a tetravalent aromatic residue group

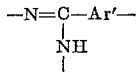

may form through group —CO— attached to the adjacent carbon atom of Ar' a benzoylene benzothiadiazine dioxide ring resulting in the rewrite of the above Formula I into the following responsive formula

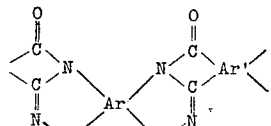

(II)

wherein Ar and Y are the same as above, and Ar' is an aromatic ring.

In the polymer having the repeated unit of Formula II, it should be understood that in the polymer molecule at most one part of Y's is CO, that is, the polymer may contain benzoylene quinazolone ring in its molecular.

The novel heterocyclic polymer of the present invention is useful for preparing various formed articles such as fiber, film and especially for insulating electroconductive materials. The insulating material coated with the heterocyclic polymer is characterized by its thermal stability, alkali- and abrasion-resistance.

The recent tendency of the electric instruments and appliances is towards making them small and light as well as automatically working, and is requiring a high severity for the properties of the insulating wire to be employed in these instruments and appliances. Particularly, an insulating wire excellent in heat-resistance and mechanical characteristics is much in request.

As to an insulating wire in heat-resistance, the wire coated with polyester or inorganic material such as glass, asbestos, ceramics etc. have been heretofore particularly used. In addition, a polyimide-insulating wire has been recently utilized in commerce, though in part.

Though the polyester-insulating wire is relatively excellent in mechanical characteristics, its heat resistance is classified into the neighbourhood of Class F; i.e. utility temperature of up to 155° C., and thus is not satisfactory. The inorganic material-insulating wire is naturally poor in such mechanical properties as flexibility, elongation, etc. and further is essentially so porous that there are problems in insulating performance, humidity resistance, etc. The polyimide-insulating wire is poor in such mechanical properties as abrasion-resistance, etc., as well as chemical resistance against alkali, etc., and thus there has been still a trouble in commercial production. The insulating wire having coatings of the new heterocyclic polymer according to the present invention will resolve the above-mentioned drawbacks of the conventional thermostable insulating wire.

The present invention also relates to a novel polyamide from which the heterocyclic polymer (II) is prepared and which is also useful for producing molded article such as fiber and film; paint, adhesive as well as electroinsulating material.

The novel polyamide is represented by the following repeated unit of the formula

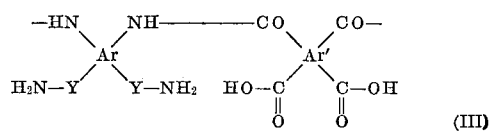

(III)

wherein Ar, Ar' and Y as well as the positions of the Ar attached with —Y—$NH_2$ and —NH— are the same as defined in the explanation of the polymer II.

The average molecular weight of all the heterocyclic polymers and the intermediate polyamide is preferably at least 0.2 of $\eta_{sp./c.}$ (reduced viscosity) as a parameter as measured in a solution of them in dimethylsulfoxide at a concentration of 0.1 g./100 ml. and at a temperature of 30° C.

The present inventors have studied a number of reactions in respect to various compounds for obtaining the thermostable heterocyclic polymer which is the object of the present invention, and have found that a novel heterocyclic ring is formed by the following reaction:

(a)

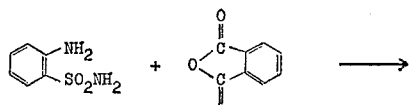

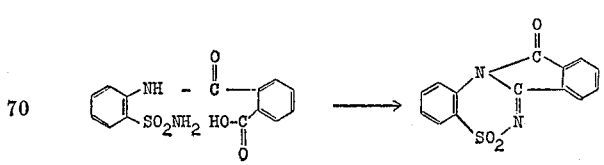

(b)
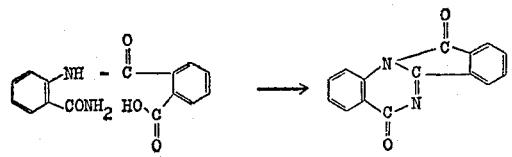

(c)
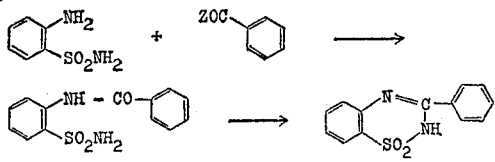

(d)
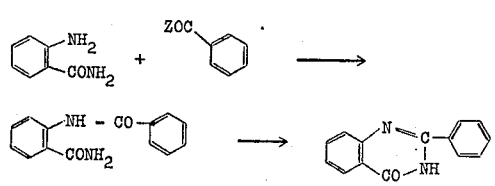

wherein Z represents a halogen atom.

According to the above knowledge, the present inventors have developed the above reactions to obtain polymers by the use of polyfunctional aromatic compounds. Thus, we have achieved the present invention concerning the process for obtaining the novel polymers as represented by Formulae I and II, by reacting either at least one aromatic tetracarboxylic acid dianhydrides or di-or more basic carboxylic acid halides with at least one aromatic diaminodiamido compounds of (V), (VI), (VII) and (VIII) as hereinafter indicated, in an inert solvent to obtain a polyamide of the Formula III or

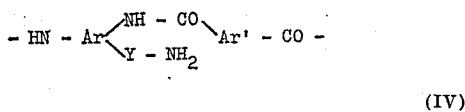

(IV)

wherein Ar, Ar' and Y are the same as above, and then cyclizing under dehydration the obtained polyamide by heating or by contacting with dehydrating agent.

The word "aromatic" used in the present specification and claims is contemplated to mean not only mononucleus and polynucleus conjugated rings but also the same linked mutually with or without a radical which does not participate with the reaction as well as an unsaturated aliphatic cyclic compound which is referred to have an aromatic property.

In the process above mentioned, the polymer (II) or polyamid (III) which includes CO as a part of Y's in the molecule can be obtained by the use of a mixture of the diaminodiamido compounds in one of which Y's are $SO_2$ and in another of which Y's are CO, or of the diaminodiamido compound where one Y is $SO_2$ and the other is CO.

The aromatic diaminodiamido compound used in the process of the present invention is selected from the group consisting of the compounds of the formulae

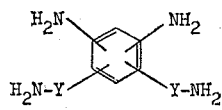

(V)

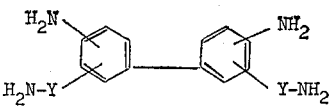

(VI)

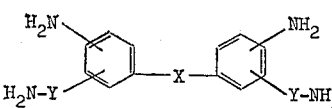

(VII)

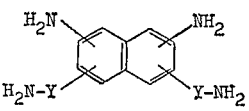

(VIII)

wherein Y is $SO_2$ or CO, X represents O, $CH_2$, $SO_2$, S or CO, and the positions of the each ring attached with $NH_2$ and Y—$NH_2$ are the same as above without any restrictions, and wherein the aromatic nucleus may be substituted with additional groups which do not participate with the reaction, such as alkyl, nitro groups and halogen atom.

Therefore, one feature of the present invention resides in a process for producing a film-forming polyamide having a repeated unit of the Formula III comprising reacting at least one aromatic diaminodiamido compounds of the Formulae V, VI, VII and VIII with at least one aromatic tetracarboxylic acid dianhydrides and recovering the resulting polymer.

A further feature of the present invention resides in a process for producing a film-forming heterocyclic polymer having a repeated unit of the Formula II comprising cyclizing under dehydration the polyamide having the repeated unit of the Formula III.

Another feature of the present invention resides in a process for producing coatings of the solid heterocyclic polymer having a repeated unit of the Formula II directly or through other insulating material on the surface of electroconductive wire which comprises applying the solution of said polymer to the wire, removing the solvent to form a film of the polymer on the wire, and cyclizing under dehydration said polymer in the form of film.

A still another feature of the present invention resides in a process for producing a solid film-forming heterocyclic polymer having a repeated unit of the Formula I comprising reacting at least one aromatic diaminodiamido compounds of the Formulae V, VI, VII and VIII with at least one aromatic or aliphatic di- or more basic acid halides in an inert solvent and cyclizing under dehydration the resulting polyamide having a repeated unit of the Formula IV by heating or contacting with dehydrating agent.

The example of such diaminodiamido compounds of the Formulae V, VI, VII and VIII includes, for example, 4,4'-diaminodiphenylether-3,3'-disulfonamide,
4,4'-diaminodiphenylmethane-3,3'-disulfonamide,
4,4'-diaminodiphenyl-3,3'-disulfonamide,
4,4'-diaminodiphenyl-sulfone-3,3'-disulfonamide,
3,3'-diaminodiphenylether-4,4'-disulfonamide,
4,4'-diaminodiphenylsulfide-3,3'-disulfonamide,
4,4'-diaminobenzophenone-3,3'-disulfonamide;
4,4'-diaminodiphenylether-3,3'-dicarbonamide,
4,4'-diaminodiphenylmethane-3,3'-dicarbonamide,
4,4'-diaminodiphenyl-3,3'-dicarbonamide,
3,3'-diaminodiphenylether-4,4'-dicarbonamide,
4,4'-diaminodiphenylether-3-carbonamide-3'-sulfonamide;
1,4-diaminobenzene-2,5-disulfonamide,
1,3-diaminobenzene-4,6-disulfonamide,
1,3-diaminobenzene-4-sulfonamide-6-carbonamide, 1,4-diaminobenzene-2-sulfonamide-5-carbonamide;
2,7-diaminonaphthalene-3,6-disulfonamide,
2,7-diaminonaphthalene-3-sulfonamide-6-carbonamide,
2,6-diaminonaphthalene-3,7-disulfonamide,
2,6-diaminonaphthalene-3-sulfonamide-7-carbonamide,
1,5-diaminonaphthalene-2,6-disulfonamide,
1,5-diaminonaphthalene-2-sulfonamide-6-carbonamide,
1,6-diaminonaphthalene-2,5-disulfonamide,
1,6-diaminonaphthalene-2-carbonamide-5-sulfonamide,
1,6-diaminonaphthalene-2-sulfonamide-5-carbonamide,
1,6-diaminonaphthalene-2,7-disulfonamide,
1,6-diaminonaphthalene-2-carbonamide-7-sulfonamide,
1,6-diaminonaphthalene-2-sulfonamide-7-carbonamide,
1,7-diaminonaphthalene-2,6-disulfonamide,
1,7-diaminonaphthalene-2-carbonamide-6-sulfonamide and
1,7-diaminonaphthalene-2-sulfonamide-6-carbonamide.

The aromatic tetracarboxylic dianhydride used in the process for producing the polyamide of the repeated unit (III) or the heterocyclic polymer of the repeated unit of Formula II includes, for example, pyromellitic dianhydride,
3,3′,4,4′-diphenyltetracarboxylic acid dianhydride,
3,3′,4,4′-diphenyltetracarboxylic acid dianhydride,
cyclopentadiene tetracarboxylic acid dianhydride,
3,3′,4,4′-benzophenone tetracarboxylic acid dianhydride,
1,2,5,6-naphthalene tetracarboxylic acid dianhydride,
2,3,6,7-naphthalene tetracarboxylic acid dianhydride,
2,3,5,6-pyridine tetracarboxylic acid dianhydride,
3,4,9,10-perylene tetracarboxylic acid dianhydride and
4,4′-sulphonyldiphthalic acid anhydride.

The aliphatic or aromatic polybasic carboxylic acid halide used in the process for producing the polyamide of the repeated unit of Formula IV and heterocyclic polymer of the repeated unit of Formula I includes for example, isophthaloyl dihalide, telephthaloyl dihalide, phthaloyl dihalide, 4,4′-diphenyldicarboxylic acid dihalide, 4,4′-diphenylether dicarboxylic acid dihalide, 4,4′-diphenylsulfone dicarboxylic acid dihalide, naphthalene 2,6-dicarboxylic dihalide; oxalic acid dihalide, malonyl dihalide, succinyl dihalide, glutalyl dihalide, adipyl dihalide, pimeloyl dihalide, suberyl dihalide, azelyl dihalide, sebacyl dihalide, 1,10-decane dicarboxylic acid dihalide, cyclopentane dicarboxylic acid dihalide, cyclohexane dicarboxylic acid halide, and fumalic acid dihalide.

According to the present invention, the reaction of the afore-mentioned aromatic diaminodiamido compound and the aromatic tetracarboxylic acid anhydride or the aliphatic or aromatic polybasic carboxylic halide are carried out in the presence of an inert solvent which is not always a cosolvent for both reactants. The preferable solvent is, in particular, of effective for dissolving the product, polyamide, as well. The example of such a solvent includes, for example, N-methyl-2-pyrrolidone, N,N - dimethylacetamide, N,N - dimethylformamide, dimethylsulfoxide, hexamethylphosphoramide and tetramethylsulfone.

In addition, a solubilizing agent which has been used for facilitating the resolution of the polymer, such as lithium chloride and magnesium chloride, may be added thereto.

The reaction is carried out in the above-mentioned solvent in which the reactants is dissolved as much as possible by controlling the reaction temperature not to exceed more than 80° C., and preferably at a room temperature or the lower while stirring. The reaction can proceed smoothly by paying the above caution, and the viscosity of the reaction increases gradually, showing the formation of the polyamide.

Some of the embodiments of the procedures are illustrated as follows:

(a) Simultaneous addition of the both reactants into the inert solvent.

(b) Addition of the diaminodiamido compound and then tetracarboxylic acid dianhydride or dibasic acid halide into the inert solvent or (c) vice versa. However, it will not be appreciated that the present invention is restricted in such three procedures and other procedures may be taken optionally.

Thus obtained polyamide solution may be used directly as a dope to make fiber, film and others by casting, but if desired, the polyamide may be recovered, for example, by evaporating the solvent under reduced pressure or pouring the solution into a non-solvent to precipitate the polyamide.

The polyamide can be converted to the heterocyclic polymer either by heating at a temperature of 200° to 400° C. and, if desired, under reduced pressure, or by heating at a temperature of 150° C. in its solution in dimethylformamide-sulfur-trioxide complex, resulting in ring-closure under dehydration.

When the above conversion is effected at a relatively high temperature, a cross-linked polymer which is also useful for insulating coatings may be formed from the polyamide having the repeated unit of Formula III as shown by the following Schema

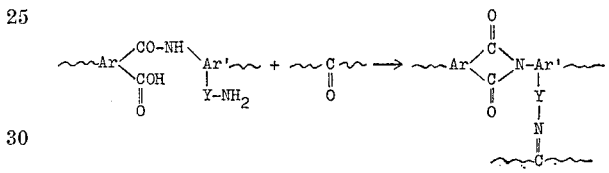

The following examples are given to more concretely explain the present invention, but it should not be understood that the present invention is limited thereto. The reduced viscosity referred to therein is measured in the solution of polymer in dimethylsulfoxide at a concentration of 0.1 gram/100 ml. and at a temperature of 30° C.

EXAMPLE 1

Into a three-necked flask having a volume of 300 ml., provided with a thermometer, stirrer and calcium chloride tube, 8.95 g. of 4,4′-diaminodiphenylether-3,3′-disulfonamide and 150 ml. of N-methyl-2-pyrrolidone were placed and stirred while cooling the flask in a ice bath. Then, 8.05 g. of 3,3′,4,4′-benzophenone tetracarboxylic acid dianhydride was added stepwise with paying attention to the temperature of the reaction system not to increase above 10° C. After adding the dianhydride the mixture is allowed to reaction for 7 hours. A part taken out of the resulting reaction mixture was poured into methanol to precipitate the product, and $\eta_{sp./c.}$ was measured. The value of the viscosity showed 1.06 dl./g.

A tough film of the polyamide was obtained by casting the reaction mixture (solution) onto a glass plate and drying at 60° C. under vacuum for 90 minutes. The mechanical properties of thus obtained film not subjected to heat-treatment were 800 kg./cm.$^2$ in tensile strength and 10% in ultimate elongation.

EXAMPLE 2

Into a flask similar to Example 1, 4.48 gram of 4,4′-diaminodiphenylether-3,3′-disulfonamide, 3.58 g. of 4,4′-diaminodiphenylether-3,3′-dicarbonamide and 150 ml. of N,N-dimethylformamide were placed, and the mixture was sufficiently stirred while cooling by means of ice bath. To the mixture, 8.05 gram of 3,3′-4,4′-benzophenone tetracarboxylic acid dianhydride and the reaction was effected for 10 hours.

The reduced viscosity of the yielding polyamide was 0.98 dl./gram. A tough film having a tensile strength of 1500 kg./cm.$^2$ and a elongation at break of 8% was obtained by the procedure as in Example 1.

EXAMPLE 3

Into a three necked 50 ml. flask, 3.58 grams of 4,4'-diaminodiphenylether-3,3'-disulfonamide and 30 ml. of N,N-dimethylacetamide was placed, and the mixture was well stirred while cooling with ice bath. To the mixture, 2.18 g. of pyromellitic dianhydride was added gradually while maintaining the temperature of the mixture at not higher than 10° C. After the completion of the addition, the mixture was allowed to react for 7 hours. The reduced viscosity, $\eta_{sp./c.}$ of the thus obtained polyamide was 0.86 dl./gram.

A tough film of the polyamide was obtained by the same procedure in Example 1. The film has a tensile strength of 500 kg./cm.$^2$ and a elongation at break of 5 percent.

EXAMPLE 4

Into a 200 ml. flask similar to Example 1, 5.320 g. (0.02 mole) of 1,4-diaminobenzene-2,5-disulfonamide and 70 ml. of N-methyl-2-pyrrolidone were placed, and the mixture was stirred while cooling by means of ice-bath. To the mixture, 6.44 g. (0.02 mole) of 3,3',4,4'-benzophenone tetracarboxylic acid dianhydride was added gradually. After the completion of the addition, the reaction was effected for 6 hours. The viscosity after the completion of the reaction showed 120 stokes, and $\eta_{sp./c.}$ of the reaction product was 0.71 dl./g.

The mechanical strength of a film prepared by casting the reaction mixture as described in Example 1 was 600 kg./cm.$^2$ in tensile strength and 4 percent in elongation at break.

EXAMPLE 5

Into a 200 ml. flask similar to Example 1, 6.32 g. (0.02 mole) of 2,6-diaminonaphthalene-3,7-disulfonamide and 80 ml. of N-methyl-2-pyrrolidone were placed, and the mixture was stirred while cooling by means of ice bath. To the mixture, 6.44 g. (0.02 mole) of 3,3',4,4'-benzophenone tetracarboxylic acid dianhydride was gradually added. After the completion of adding, the reaction was continued for 9 hours. The viscosity after the completion of the reaction showed 110 stokes and $\eta_{sp./c.}$ of the reaction product was 0.86 dl./g. A tough film having a tensile strength of 700 kg./cm.$^2$ and an elongation at break of 3.6 percent was obtained by the procedure as described in Example 1.

EXAMPLE 6

Into a 200 ml. flask similar to that used in Example 1, 17.1 gram of benzidine-3,3'-disulfonamide and 100 ml. of dimethylsulfoxide were placed, and the mixture was well stirred. To the mixture, 16.1 gram of 3,3',4,4'-benzophenone dicarboxylic acid dianhydride was stepwise added. After the addition, the mixture was allowed to react for 5 hours while stirring. A part taken out of the reaction mixture was poured into methanol to precipitate the product, the precipitate was filtered off and dried under reduced pressure. The reduced viscosity, $\eta_{sp./c.}$, of thus obtained product was 0.4, and the melting point thereof was above 300° C.

The product was cast into film from the viscous solution of the reaction mixture, and when the film was heated at 200° to 400° C. under reduced pressure a polymer having benzoylene benzothia diazine dioxide ring is formed in the form of film due to the ring-closure. No reduction of weight of the polymer was observed even when heating it in the air atmosphere up to 500° C. at an increasing recite of 5° C./min. The mechanical property was 2,500 kg./cm.$^2$ in tensile strength and 10 percent in elongation at break.

EXAMPLE 7

Into a similar flask used in Example 6, 3.56 gram of 4,4'-diaminodiphenylmethane-3,3'-disulfonamide and 30 ml. of N,N-dimethylacetamide were placed, and the mixture was added with 2.18 gram of pyromellitic dianhydride stepwise while stirring. After completion of the addition, the reaction was continued at room temperature for 5 hours with stirring. After the completion of the reaction, the reduced viscosity of the product was 0.5, and the melting point thereof was above 300° C.

The thus obtained polyamide was converted to a polymer having benzoylene benzothiadiazine dioxide ring by subjecting to heat-treatment at a temperature of 200° to 400° C. for 3 hours to cause the ring-closure. No reduction of weight of the polymer was observed by heating it up to 500° C. in air atmosphere. The tensile strength and elongation at break of a cast film prepared from the solution of the product were 2,000 kg./cm.$^2$ and 20 percent, respectively.

EXAMPLE 8

Into a 200 ml. flask similar to that used in Example 1, 3.58 g. of 4,4'-diaminodiphenylether-3,3'-disulfonamide and 30 ml. of N,N-dimethylformamide were placed, and the mixture was added with 3.22 g. of 3,3',4,4'-benzophenone tetracarboxylic acid dianhydride stepwise while stirring. After addition, the reaction was further continued at a room temperature for 7 hours.

The polyamide thus obtained had a reduced viscosity ($\eta_{sp./c.}$) of 0.6 and a melting point of above 300° C.

The polyamide was converted to a polymer having benzoylene benzothiadiazine dioxide ring by heating it at a temperature of 200° to 400° C. under reduced pressure for 4 hours to cause the ring-closure. No reduction of weight of the polymer was observed when heating it up to 500° C. The tensile strength and elongation at break of the cast film were 2,000 kg./cm.$^2$ and 30 percent respectively.

EXAMPLE 9

Example 1 was repeated, except that the scale was enlarged, that is, the reaction was carried out in 3,000 ml. flask by using 179 g. of the same disulfonamide, 2,000 ml. of the solvent and 161 g. of the same dianhydride. The viscosity of the reaction mixture was 150 stokes and reduced viscosity, $\eta_{sp./c.}$, of the polyamide was 0.92 dl./g.

The reaction mixture was applied directly to a electroconductive wire having a diameter of 1 mm. followed by baking at a temperature of 400° C. A electroninsulating wire was obtained by repeating the application and backing according to the conventional steps.

The coatings on the wire are remarkably superior in the properties of abrasion- and alkali-resistance and heat-stability, because of the occurrence of the benzoylene benzothiadiazine dioxide structure as the result of crosslinkage or ring-closure under dehydration due to subjecting to high temperature on the baking.

EXAMPLE 10

Into a similar flask used in Example 9, 89.5 grams of 4,4'-diaminodiphenylether-3,3'-disulfonamide, 71.5 grams of 4,4' - diaminodiphenylether - 3,3' - dicarbonamide and 2,000 ml. of N,N-dimethylacetamide were placed, and the mixture was well agitated while cooling with ice bath. To the mixture, a mixture of 54.5 g. of pyromellitic dianhydride and 80.5 g. of 3,3',4,4'-benzophenone tetracarboxylic acid dianhydride was added stepwise, and the reaction was continued further 7 hours. The reaction mixture in the form of a solution had a viscosity of 80 stokes, and the polyamide therein had a reduced viscosity ($\eta_{sp./c.}$) of 0.89 dl./gram. A electroinsulating wire was obtained by the procedure same as in Example 9.

EXAMPLE 11

Example 9 was repeated in 3,000 ml. flask by the use of 179 grams of the same disulfonamide, 1,500 ml. of the same solvent and 109 g. of the same anhydride, except that the reaction was continued for 9 hours. The viscosity of the reaction mixture was 120 stokes and $\eta_{sp./c.}$ of the yielding polyamide was 0.84 dl./g.

An insulating wire similar to that of Example 9 was obtained according to the procedure described therein.

EXAMPLE 12

Into a three necked 3,000 ml. flask provided with a thermometer, stirrer and calcium chloride tube, 172 grams of 4,4′-diaminodiphenylether-3,3′-disulfonamide and 2,000 ml. of N,N-dimethylacetamide, and the mixture was cooled by means of ice bath and stirred. To the mixture, a mixture of 54.5 grams of pyromellitic dianhydride and 80.5 gram of 3,3′-,4,4′-benzophenone tetracarboxylic dianhydride were stepwise added. The reaction was continued for 9 hours. The reaction mixture thus obtained has a viscosity of 110 stokes, and $\eta_{sp./c.}$ of the yielding polyamide was 0.98 dl./g.

An insulating wire similar to that of Example 9 was obtained according to the procedure described therein.

EXAMPLE 13

Into a three necked 100 ml. flask similar to that used in Example 1, 7.16 grams of 4,4′-diaminodiphenylether-3,3′-disulfonamide and 30 ml. of N-methyl-2-pyrrolidone were placed and stirred. Then, the flask was cooled in ice bath to maintain the mixture at below 10° C. The mixture was added stepwise with 5.90 grams of 4,4′-diphenylether-dicarboxylic acid dichloride while stirring and maintaining the above temperature. The reaction proceeds smoothly resulting in increasing the viscosity of the reaction mixture, and the reaction completed in 30 minutes after the addition of the acid halide, accompanying impossibility of the stirring. Then, the reaction mixture was poured into water, crushed by means of mixer, and washed with water to remove the yielding hydrochloric acid.

The reduced viscosity ($\eta_{sp./c.}$) of the polyamide thus obtained was 2.1. A tough film was obtained by casting the solution of the polymer.

A resinous substance having benzothiadiazine dioxide ring was obtained by heating the polyamide at a temperature of 300° to 400° C. for 3 hours under reduced pressure to cause the ring-closure under dehydration. When the resinous substance was heated to 450° C., in the air atmosphere, no reduction of the weight was observed.

EXAMPLE 14

Example 13 was repeated in 50 ml. flask similar to that in Example 13, except that the reaction was carried out by the use of 3.56 grams of 4,4′-diaminodiphenylmethane-3,3′-disulfonamide as the diaminodiamido compound, 15 ml. of the same solvent, and 2.03 grams of isophthaloyl dichloride as the acid dihalide. The reaction proceeded promptly as in Example 13. The reduced viscosity of the yielding polyamide was 0.9.

A resinous substance having benzothiadiazine dioxide ring was obtained by heating the above polyamide at a temperature of 300° to 400° C. for 2 hours under reduced pressure. The resinous substance did not reduce its weight even when heating it up to 400° C. in the air atmosphere.

EXAMPLE 15

Example 13 was repeated in a similar 100 ml. flask, provided that the reaction was carried out by the use of 7.16 grams of 4,4′-diaminodiphenylether-3,3′-disulfonamide as the diaminodiamido compound, 30 ml. of N-methyl-2-pyrrolidone as the solvent, and 4.06 g. of isophthaloyl dichloride as the dihalide. The reaction completed in 30 minutes after the addition of the dihalide. A polyamide having a reduced viscosity ($\eta_{sp./c.}$) of 1.5 was thus obtained.

The polyamide was heated under reduced pressure at a temperature of 300° to 400° C. and converted to a resinous substance having benzothiadiazine dioxide ring as the result of ring-closure under dehydration. The resinous substance did not reduce its weight when heating it to 500° C. in the air atmosphere.

EXAMPLE 16

Into a three-necked flask similar to that used in Example 14, 2.84 g. of 4,4′-diaminodiphenylmethane-3,3′-dicarbonamide, 30 ml. of N-methyl-2-pyrrolidone and 1.5 g. of lithium chloride were placed and stirred thoroughly while cooling the flask in an ice bath to keep the temperature of the reaction system below 10° C. With stirring, 2.03 g. of isophthaloyl dichloride was added to the above mixture gradually. The reaction proceeds speedy as in case of Example 13, and completed in 30 minutes. Then, the reaction product was poured into water, crushed by means of mixer, and washed with water to remove the yielding acid. The reduced viscosity ($\eta_{sp./c.}$) of the polyamide thus obtained was 0.5.

A resinous substance having quinazolone ring was obtained by heating the polymer at a temperature of 300°–350° C. for 3 hours under reduced pressure. When the resinous substance was heated to 400° C. in the air atmosphere, no reduction of the weight was observed.

EXAMPLE 17

Into a 100 cc. three-necked flask similar to that used in Example 14, 2.66 g. (0.01 mole) of 1,4-diaminobenzene-2,5-disulfonamide and 30 cc. of N-methyl-2-pyrrolidone were placed and stirred while cooling the flask in an ice bath to keep the temperature below 10° C. Into the solution, 2.03 g. (0.01 mole) of isophthaloyl dichloride was gradually added, resulting in increasing the viscosity of the reaction mixture. After the completion of the addition, the reaction was carried out for 30 minutes at a temperature of up to 10° C. to give viscose transparent solution. Then, the solution was poured into water to precipitate a polyamide. The polyamide was then crushed by means of mixer and washed with water to remove the acid thoroughly. The $\eta_{sp./c.}$ of the polyamide thus obtained was 1.8 dl./g.

Then, the polyamide was dissolved in N,N-dimethylformamide, cast onto a glass plate, and the yielding film was subjected to heating at 200° to 300° C. This film was removed from the glass plate and further heated at a temperature of 300°–400° C. in vacuum to give a tough film. The mechanical strength of the film was as follows: tensile strength; 1,200 kg./cm.$^2$, elongation at break: 3%, initial temperature for reducing its weight at increasing temperature rate of 5° C./min. in the air atmosphere: 450° C.

EXAMPLE 18

Example 17 was repeated in a similar 100 ml. flask, provided that the reaction was carried out by the use of 3.16 g. (0.01 mole) of 2,6-diaminonaphthalene-3,7-disulfonamide, 40 cc. of N-methyl-2-pyrrolidone, and 2.95 g. (0.01 mole) of 4,4′-diphenylether dicarboxylic acid dichloride. The reaction completed in 30 minutes after the addition of the dihalide. A polyamide having $\eta_{sp./c.}$ of 2.0 dl./g. was thus obtained.

A tough film obtained by the similar procedures as Example 17 had the following mechanical strength and heat resistance; tensile strength: 1,500 kg./cm.$^2$, elongation at break: 4.5%, initial temperature for reducing its weight in the similar conditions as Example 17: 450° C.

EXAMPLE 19

Example 17 was repeated in a similar 200 ml. flask, provided that the reaction was carried out by the use of 8.95 g. of 4,4′-diaminophenylether-3,3′-disulfonamide, 100 cc. of N-methyl-2-pyrrolidone, and a mixture of 4.77 g. of isophthaloyl dichloride and 0.27 g. of trimesic acid trichloride. The reaction completed in 30 minutes after the addition of the mixture. A polyamide having $\eta_{sp./c.}$ of 2.3 dl./g. was thus obtained.

A tough film obtained by the similar procedures as described in Example 17, had the following mechanical strength and heat resistance; tensile strength: 1,750 kg./cm.², elongation at break: 2.0%, initial temperature for reducing its weight in the similar conditions as Example 17 was 480° C.

As previously mentioned herein, the new heterocyclic polymer is above all useful for the insulating coatings on the electroconductive material, especially wire or cable.

This is shown in the following table in which the performance of each of the insulating wire produced, for example, in Examples 9 to 12 are summarized together with that of the conventional polyimide-insulating wire for comparison.

To the mixture, 14.8 grams of phthalic anhydride were added, and the reaction was continued for 30 minutes at a room temperature with stirring. After the completion of reaction, the reaction mixture was poured into water to precipitate the product. The product recrystallized from water melts at 188° C. The product was confirmed as 2-carboxybenzoylaminobenzamide-(2) from the result of the following elemental analysis:

Found (percent): C, 72.64; H, 3.10; N, 11.37. Calculated (percent): C, 72.58; H, 3.23; N, 11.29.

2-carboxybenzoylaminobenzamide-(2) thus obtained was heated at a temperature of 200° C. for 1 hour and

| Item of the performance | Example | | | | Polyimide-insulating wire |
|---|---|---|---|---|---|
| | 9 | 10 | 11 | 12 | |
| Baking conditions: | | | | | |
| Diameter of bare wire, mm | 1,000 | 1,000 | 1,000 | 1,000 | 1,000 |
| Thickness of coatings, mm | 0.040 | 0.042 | 0.041 | 0.042 | 0.041 |
| Baking temperature, ° C | 400 | 400 | 400 | 400 | 400 |
| Drawing speed, m./min | 8.0 | 8.0 | 8.0 | 8.0 | 8.0 |
| Performance: pin-hole | 0 | 0 | 0 | 0 | 0 |
| Windability (mandrel test): | | | | | |
| Initial | d—OK | d—OK | d—OK | d—OK | d—OK |
| After aging at 250° C.-24 hours | d—OK | d—OK | d—OK | 2d—OK | d—OK |
| Softening point under load of 1 kg., ° C | <430 | <450 | <450 | <450 | 400 |
| Heat-shock resistance (300° C.-1 hour) | d—OK | d—OK | d—OK | d—OK | d—OK |
| Abrasion resistance (NEMA reprocicalings system), number of times | <300 | 258 | 187 | <300 | 19 |
| Pencile hardness | 6H | 6H | 6H | 7H | 4H |
| Break-down voltage (KV): | | | | | |
| Initial | 11.3 | 12.5 | 10.6 | 13.5 | 11.0 |
| After aging at 250° C.-24 hours | 11.0 | 12.3 | 10.8 | 13.4 | 10.5 |
| Chemical and solvent resistance (room temp.-24 hours.): | | | | | |
| Sulfuric acid (specific gravity 1.2) | 6H | 6H | 6H | 7H | 4H |
| Caustic soda (10% solution) | 4H | 2H | 2H | 4H | swelling |
| Ethanol | 6H | 6H | 6H | 6H | 4H |
| Benzene | 6H | 6H | 6H | 6H | 4H |

As shown in the above table, the insulating wires made in Examples 9–12 are not only remarkably excellent in such properties as heat-softening resistance, abrasion- and alkali-resistance as compared with a conventional polyimide-insulating wire, but maintains extremely good balance of the whole performance. These effects is believed as the result of the occurrence of the polymer having the new heterocyclic ring of the Formula IV or V according to the present invention.

The formation of the new heterocyclic ring of the Formula IV is confirmed by model experiments shown in the following examples.

EXAMPLE 20

Into a three-necked 100 ml. flask provided with a thermometer, stirrer and calcium chloride tube, 1.72 grams of 2-aminobenzenesulfonamide and 15 ml. of acetone were placed and agitated. The mixture was added with a solution of 1.48 grams of phthalic anhydride in 15 cc. of acetone at a room temperature. The reaction completed immediately after the addition, and 2-carboxybenzoylaminobenzene-2-sulfonamide was recovered from the reaction mixture by distilling off acetone. The product was recrystallized from ethylalcohol. The melting point of the compound was 157° C., and elemental analysis showed as follows:

Found (percent): C, 52.41; H, 3.85; N, 8.46. Calculated (percent): C, 52.50; H, 3.75; N, 8.75.

2-carboxybenzoylaminobenzene-2-sulfonamide thus obtained was heated at a temperature of 200° C. for 1 hour, and the product was recrystallized from benzene. Benzoylene 1,2,4-benzothiadiazine-1,1-dioxide which melts at 274° to 275° C. was obtained in the theoretical yield of 96.6%. The elemental analysis shows as follows:

Found (percent): C, 59.13; H, 2.86; N, 9.65. Calculated (percent): C, 59.15; H, 2.82; N, 9.87.

EXAMPLE 21

Into a three-necked 200 ml. flask as provided in Example 20, 13.6 grams of 2-aminobenzamide and 100 ml. of N,N-dimethylacetamide were placed and well agitated.

then at 240° C. for 5 minutes. Benzoylenequinazolone was obtained as the results of ring-closure. This product melts at 229° C. after recrystallized from benzene. The structure was confirmed by elemental analysis and infrared spectra. The analysis shows as follows:

Found (percent): C, 72.64; H, 3.10; N, 11.37. Calculated (percent): C, 72.58; H, 3.23; N, 11.29.

The formation of the new heterocyclic ring in the unit of the polymers is also confirmed by means of infrared analysis. The infrared spectra shows an adsorption at 1625 cm.⁻¹ which corresponds to the group C=N.

What we claim is:

1. A process for producing a film-forming polyamide, which comprises reacting a diaminodiamido compound represented by the formula:

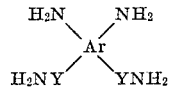

wherein Ar is benzene, naphthalene, diphenyl, diphenylether, diphenylsulfone, diphenylmethane, diphenylsulfide or benzophenone; the NH₂ group and the Y—NH₂ group are attached to adjacent carbon atoms in the Ar nucleus; and Y is SO₂ or CO, at least one of the Y groups being SO₂, with an aromatic tetracarboxylic dianhydride in an inert solvent at a temperature of less than 80° C.

2. A process according to claim 1, wherein the diaminodiamido compound is a compound represented by the formula:

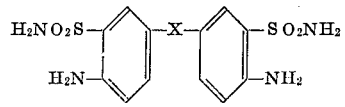

wherein X is O, CO, CH₂, SO₂ or S.

3. A process according to claim 2, wherein the diaminodiamido compound is 4,4'-diaminodiphenylether-3,3'-disulfonamide, and the tetracarboxylic dianhydride is 3,3',4,4'-benzophenone-tetracarboxylic dianhydride.

4. A process according to claim 2, wherein the diaminodiamido compound is 4,4'-diaminodiphenylether-3,3'-disulfonamide and the aromatic tetracarboxylic dianhydride is a mixture of pyromellitic dianhydride and 3,3',4,4'-benzophenone-tetracarboxylic dianhydride.

5. A process according to claim 2, wherein the diaminodiamido compound is 4,4'-diaminodiphenylmethane-3,3'-disulfonamide, and the aromatic tetracarboxylic dianhydride is pyromellitic dianhydride.

6. A process according to claim 1, wherein the diaminodiamido compound is a compound represented by the formula:

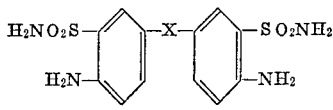

wherein X is O, CO, CH₂, SO₂ or S.

7. A process according to claim 6, wherein the diaminodiamido compound is 4,4'-diaminodiphenylether-3,3'-disulfonamide, and the acid halide is isophthalic dichloride.

8. A process according to claim 6, wherein the diaminodiamido compound is 4,4'-diaminodiphenylether-3,3'-disulfonamide, and the acid halide is 4,4'-diphenyl-ether-dicarboxylic acid dichloride.

9. A process according to claim 6, wherein the diaminodiamido compound is 4,4'-diaminodiphenylether-3,3'-disulfonamide, and the halide is a mixture of trimesic acid trichloride and isophthalic acid dichloride.

10. A process according to claim 6, wherein the diaminodiamido compound is 4,4'-diaminodiphenylmethane-3,3'-disulfonamide, and the polycarboxylic acid halide is isophthalic acid dichloride.

11. A process for producing a film-forming heterocyclic polymer, which comprises reacting a diaminoamido compound represented by the formula:

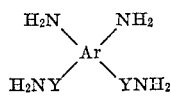

wherein Ar is benzene, naphthalene, diphenyl, diphenylether, diphenylsulfone, diphenylmethane, diphenylsulfide or benzophenone; the NH₂ group and the YNH₂ group are attached to adjacent carbon atoms in the Ar nucleus; and Y is SO₂ or CO, at least one of the Y groups being SO₂, with an aromatic tetracarboxylic dianhydride in an inert solvent, and heating the resulting polyamide at a temperature of 200° to 400° C.

12. A process according to claim 11, wherein the diaminodiamido compound is a compound represented by the formula:

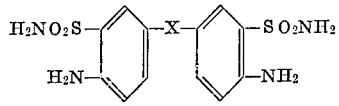

wherein X is O, CO, CH₂, SO₂ or S.

13. A process according to claim 12, wherein the diaminodiamido compound is 4,4'-diaminodiphenylether-3,3'-disulfonamide, and the tetracarboxylic dianhydride is 3,3'-4,4'-benzophenone-tetracarboxylic dianhydride.

14. A process according to claim 12, wherein the diaminodiamido compound is 4,4'-diaminophenylether-3,3'-disulfonamide, and the aromatic tetracarboxylic anhydride is a mixture of pyromellitic dianhydride and 3,3', 4,4'-benzophenone-tetracarboxylic dianhydride.

15. A process according to claim 12, wherein the diaminodiamido compound is 4,4'-diaminodiphenylmethane-3,3'-disulfonamide, and the aromatic tetracarboxylic anhydride is pyromellitic dianhydride.

16. A process for producing a film-forming polyamide, which comprises reacting a diaminodiamido compound represented by the formula:

wherein Ar is benzene, naphthalene, diphenyl, diphenylether, diphenylsulfone, diphenylmethane, diphenylsulfide or benzophenone; the NH₂ group and the Y—NH₂ group are attached to adjacent carbon atoms in the Ar nucleus; and Y is SO₂ or CO, at least one of the Y group being SO₂, with an aliphatic or aromatic di-, tri- or tetracarboxylic acid halide in an inert solvent at a temperature of less than 80° C.

17. A process for producing a film-forming polyamide, which comprises reacting a diaminodiamido compound represented by the formula:

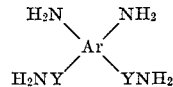

wherein Ar is benzene, naphthalene, diphenyl, diphenylether, diphenylsulfone, diphenylmethane, diphenylsulfide or benzophenone; the NH₂ group and the Y—NH₂ group are attached to adjacent carbon atoms in the Ar nucleus; and Y is SO₂ or CO, at least one of the Y groups being SO₂, with an aliphatic or aromatic di-, tri- or tetracarboxylic acid halide in an inert solvent, and heating the resulting polyamide at a temperature of 200° to 400° C.

18. A process according to claim 17, wherein the diaminodiamido compound is a compound represented by the formula:

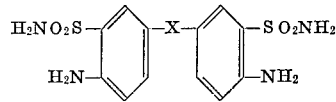

wherein X is O, CO, CH₂, SO₂ or S.

19. A process according to claim 18, wherein the diaminodiamido compound is 4,4'-diaminodiphenylether-3,3'-disulfonamide, and the acid halide is isophthalic acid dichloride.

20. A process according to claim 18, wherein the diaminodiamido compound is 4,4'-diaminodiphenylether-3,3'-disulfonamide, and the acid halide is 4,4'-diphenyl-ether-dicarboxylic acid dichloride.

21. A process according to claim 18, wherein the diaminodiamido compound is 4,4'-diaminodiphenylether-3,3'-disulfonamide, and the acid halide is a mixture of trimesic acid trichloride and isophthalic acid dichloride.

22. A process according to claim 18, wherein the diaminodiamido compound is 4,4'-diaminodiphenylmethane-3,3'-disulfonamide, and the acid halide is isophthalic acid dichloride.

References Cited
UNITED STATES PATENTS 3,461,096    8/1969    Rabilloud et al. _____ 260—47

WILLIAM H. SHORT, Primary Examiner

L. L. LEE, Assistant Examiner

U.S. Cl. X.R.

260—65, 78 TF, 79